US008811591B2

United States Patent
Taillant et al.

(10) Patent No.: US 8,811,591 B2
(45) Date of Patent: Aug. 19, 2014

(54) OPERATING MANAGEMENT OF A CALL CENTER

(75) Inventors: Jean-Marc Taillant, Le Relecq Kerhuon (FR); Sylvie Roue, Brest (FR)

(73) Assignee: Alcatel Lucent, Boulogne-Billancourt (FR)

(*) Notice: Subject to any disclaimer, the term of this patent is extended or adjusted under 35 U.S.C. 154(b) by 0 days.

(21) Appl. No.: 13/821,068

(22) PCT Filed: Sep. 6, 2011

(86) PCT No.: PCT/EP2011/065407
§ 371 (c)(1),
(2), (4) Date: Jun. 10, 2013

(87) PCT Pub. No.: WO2012/032058
PCT Pub. Date: Mar. 15, 2012

(65) Prior Publication Data
US 2013/0251135 A1    Sep. 26, 2013

(30) Foreign Application Priority Data
Sep. 6, 2010 (FR) ...................................... 10 57045

(51) Int. Cl.
*H04M 3/00* (2006.01)
(52) U.S. Cl.
USPC ................................ 379/265.03; 379/265.06
(58) Field of Classification Search
CPC ... H04M 3/51; H04M 3/5175; H04M 3/5232; H04M 3/5233; H04M 3/42221; G06Q 30/20; G06Q 10/10
USPC ............................ 379/265.02–265.03, 265.06
See application file for complete search history.

(56) References Cited

U.S. PATENT DOCUMENTS

| 8,588,396 B2* | 11/2013 | Stent et al. ............... 379/265.06 |
| 2004/0217864 A1 | 11/2004 | Nowak et al. |
| 2006/0203991 A1 | 9/2006 | Kramer et al. |

OTHER PUBLICATIONS

Ting et al., "A Dynamic RFID-Based Mobile Monitoring System in Animal Care Management Over a Wireless Network," IEEE, XP031261694, pp. 2085-2088, Sep. 21, 2007.

* cited by examiner

*Primary Examiner* — Rasha Al Aubaidi
(74) *Attorney, Agent, or Firm* — Fay Sharpe LLP

(57) ABSTRACT

To check the status of an agent assigned to a call center in which geographic areas are respectively associated with geographic area identifiers (IdZ) communication terminals (TC) are respectively associated with geographic areas, a mobile terminal (TM) in possession of a monitor capable of moving within geographic areas determines the geographic area's identifier within which an agent is located. The mobile terminal transmits a request comprising the geographic area's identifier to the data management server in order to retrieve from a lookup table an identifier (IdA) of the agent associated with the geographic area's identifier, and transmits a request comprising the agent's identifier (IdA) to the call center's server (SCA) in order to retrieve from a lookup table the identifier of the agent's status data (DonA) associated with the agent's identifier (IdA), then provides the agent's status to the monitor through graphical display based on the agent's retrieved status data (DonA).

10 Claims, 2 Drawing Sheets

OPERATING MANAGEMENT OF A CALL CENTER

Figure 1:
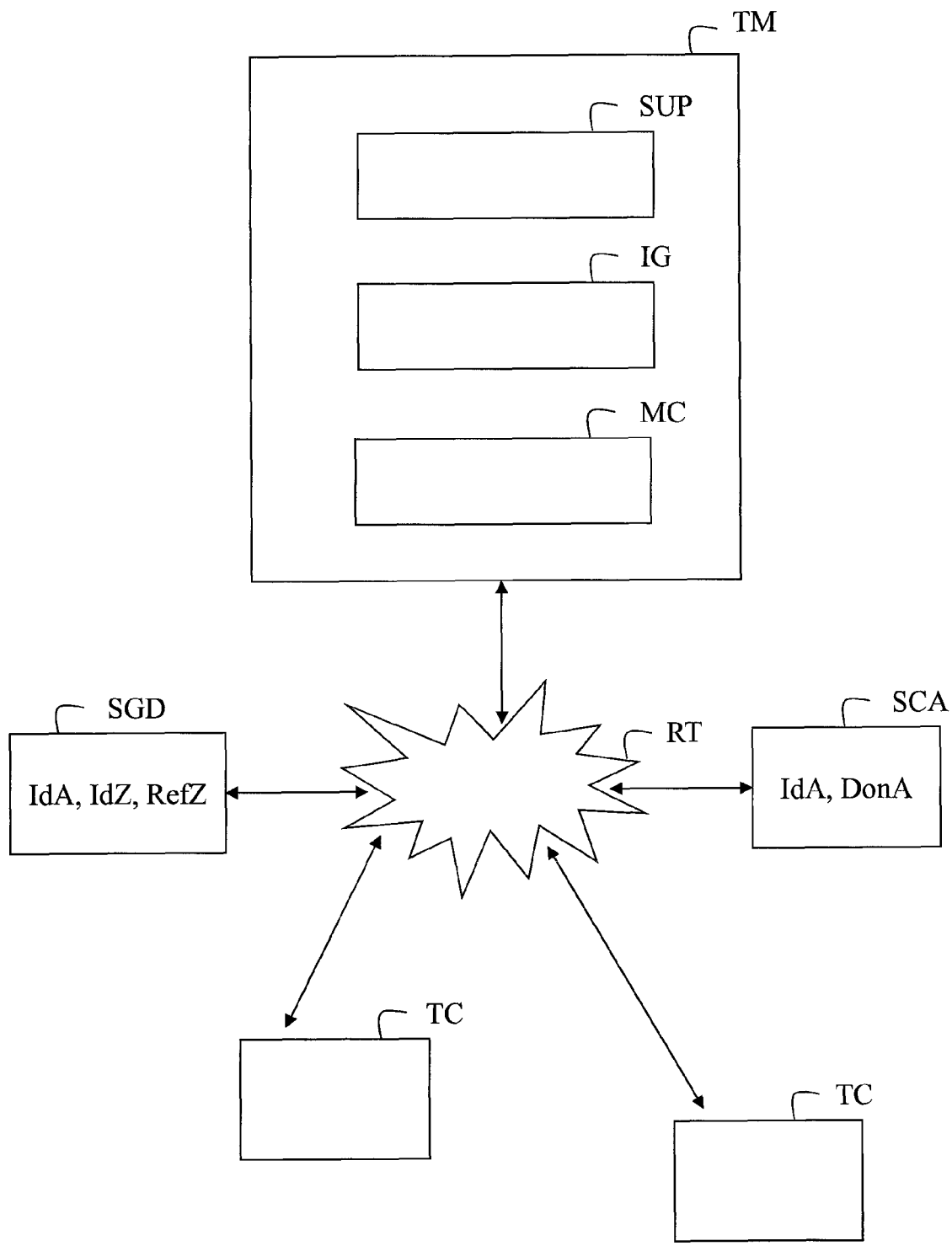

The present invention pertains to the operating management of a call center and particularly to monitoring of the status of the agents linked to the call center.

In a call center, agents are not always in the same locations. In particular, the agent may select a location with a terminal whenever he or she arrives at work, each agent being able to choose between the locations that are open. Each agent may connect to a call center via any terminal, with the help of a login and password, for example.

A supervisor, who may, for example, be a direct superior of the agents who is able to move about the call center, may wish to monitor the real-time status of each agent or group of agents, with the status potentially including information about a current call or statistics.

Furthermore, the supervisor may receive an alert regarding an agent or group of agents. Such an alert may have disappeared during the trip between the supervisor's office and the agent or group of agents to whom the alert pertains.

There is therefore a need to analyze the status of an agent or group of agents in real time, while close to the agents, for example, without disturbing them.

One purpose of the invention is to remedy the aforementioned drawbacks by proposing a system that enables a supervisor to monitor the status of a call center's agents in real time, without disturbing the agents.

In order to achieve that purpose, a method for checking the status of an agent assigned to a call center, in which geographic areas are respectively associated with geographic area identifiers, connection terminals are respectively associated with geographic areas, and at least one call center server is capable of communicating with a data management server and communication terminals, comprises the following steps in a mobile terminal of a supervisor able to move about the geographic areas:

determining an identifier of the geographic area occupied by an agent connected to the call center server via a communication terminal associated with said geographic area, transmitting a first request comprising the identifier of the geographic area to the data management server in order to retrieve within a first lookup table an identifier of the agent associated with the identifier of the geographic area, transmitting a second request comprising the agent's identifier to the call center server in order to retrieve within a second lookup table the agent's status data associated with the agent's identifier, providing at least some of the agent's retrieved status data to the supervisor through a graphical display.

Advantageously, a supervisor may quickly monitor the status of various agents assigned to a call center in real time.

According to another characteristic of the invention, in response to the agent connection to the call center server via the communication terminal associated with the geographic area, the call server may save an identifier of the agent as a match for the agent's status data in the second lookup table, and save the agent's identifier as a match for an identifier of the geographic area within the first lookup table in the data management server.

According to another characteristic of the invention, the identifier of the geographic area in which the agent is located may be determined by detecting the presence of that identifier within the geographic area.

According to other characteristics of the invention, the identifier of the geographic area may be a location data set, a radio identification data set, or a marker.

According to another characteristic of the invention, the agent's status data may comprise contact information of the agent and an indication about the agent's status.

The invention also pertains to a mobile terminal for checking the status of an agent assigned to a call center in which geographic areas are respectively associated with identifiers of geographic areas, communication terminals are respectively associated with geographic areas, and at least one call center server is capable of communicating with a data management server and communication terminals, said mobile terminal being in the possession of a supervisor capable of moving within the geographic areas and said mobile terminal comprising:

means for determining the identifier of the geographic area in which an agent who is connected to the call center server via a communication terminal associated with said geographic area is located, means for transmitting a first request comprising the identifier of the geographic area to the data management server in order to retrieve within a first lookup table an identifier of the agent associated with the identifier of the geographic area, means for transmitting a second request comprising the agent's identifier to the call center server in order to retrieve within a second lookup table the agent's status data associated with the agent's identifier, means for providing at least some of the agent's retrieved status data to the supervisor through a graphical display.

The invention also pertains to a computer program capable of being implemented within a terminal, said program comprising instructions which, whenever the program is executed within said terminal, carry out the steps according to the inventive method.

Figure 2:
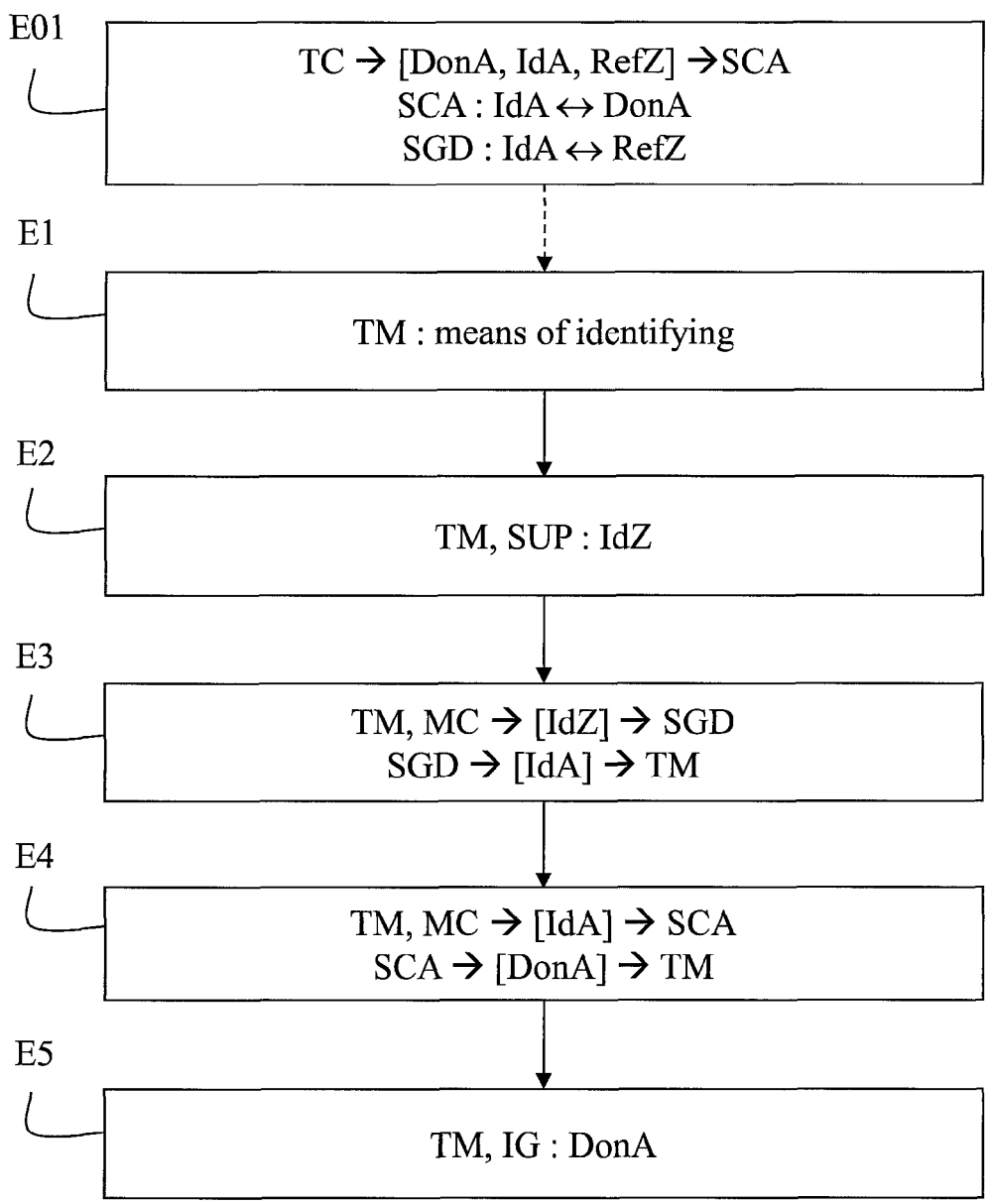

The present invention and the benefits thereof shall be better understood upon examining the description below, which makes reference to the attached figures, in which:

FIG. 1 is a schematic block diagram of the communication system according to one embodiment of the invention for managing the operation of a call center; and FIG. 2 is an algorithm of a method for managing the operation of the call center according to one embodiment of the invention.

With reference to FIG. 1, a communication system according to the invention comprises a telecommunications network RT, at least one call center server SCA, a data management server SGD, a mobile terminal TM, and several communication terminals TC.

The telecommunications network RT may comprise a wireless network, such as a digital cellular communication network of the GSM ("Global System for Mobile communications") or UMTS ("Universal Mobile Telecommunications System") type, or a short-range wireless network of the WLAN ("Wireless Local Area Network") type, or one that complies with one of the 802.1x standards, or a medium-range wireless network according to the WIMAX protocol ("Worldwide Interoperability Microwave Access").

The telecommunications network RT may be connected to an IMS ("IP Multimedia Subsystem") packet network. Furthermore, the telecommunications network RT may comprise a wired network or be a combination of wired and wireless networks.

The mobile terminal TM is in the possession of a supervisor, who monitors the status of agents who work for a call center service in real time. Each agent may freely use a communication terminal TC of his or her choice to provide the call center service, the communication terminal TC being associated with a geographic area. More particularly, the supervisor is capable of moving through multiple geographic areas, each geographic area being associated with a communication terminal or with multiple communication terminals.

For example, each of the communication terminals TC may be a personal computer or smart terminal that may communicate with the telecommunications network RT via a wired or wireless connection. Each communication terminal TC comprises means for setting up a communication with the call center server SCA.

According to one example, a mobile terminal TM is a mobile cellular radio communications terminal, connected by a radio communication channel to an access network comprising the fixed network of a radio communications network, for example one of the GSM or UMTS type.

According to another example, a mobile terminal TM comprises a device or electronic telecommunications object that is personal to the user and which can be a communicating personal digital assistant PDA ("Personal Digital Assistant"), or smartphone, or a personal computer, which may be connected to an access terminal of a short-range wireless network of the WLAN type or one compliant with one of the 802.1x standards, or a medium-range wireless network according to the WIMAX protocol.

The mobile terminal TM comprises a monitoring module SUP, a communication module MC, and a graphical user interface IG.

In the remainder of the description, the term module may designate a device, a software program, or a combination of computer hardware and software, configured to execute at least one particular task.

The mobile terminal TM is capable of communicating with the call center server SCA and the data management server SGD.

In particular, the monitoring module SUP has the feature of detecting the presence of an identifier of the geographic area, which is associated with one or more communication terminals TC and in which an agent or group of agents is located.

The monitoring module SUP uses the mobile terminal's TM capabilities most suitable for that feature. Multiple technologies supported by the mobile terminal may be used.

According to a first example, the mobile terminal may be equipped with an image-capturing means, such as a still or video camera for capturing an image of a geographic area, in order to compare an object included within the captured image with a model object or marker. For example, the marker is a roughly flat object comprising geometric shapes such as squares, and the mobile terminal is capable of recognizing such a marker within a captured image of a geographic area, the marker corresponding to an identifier of the geographic area.

According to a second example, the mobile terminal may be equipped with a short-range radio communication means for identifying a geographic area, such as a RFID ("Radio Frequency IDenfication") reader communicating with a RFID associated with the geographic area, a set of RFID data provided by the RFID badge corresponding to an identifier of the geographic area.

According to a third example, the mobile terminal may be equipped with a means of geographical positioning using a positioning service of the telecommunications network or a GPS ("Global Position System") positioning system service. Each geographic area comprises a location element transmitting a location data set to the location service, said set corresponding to an identifier of the geographic area. In such a case, the mobile terminal comprises a graphical user interface that displays, for example, the distance between the mobile terminal and each geographic area, each geographic area being automatically detected by the location service.

The call center server SCA saves a lookup table matching identifiers IdA of agents and status data DonA related to the agents, and the data management server SGD saves a lookup table matching the identifiers IdA of agents and references RefZ of geographic areas. Each geographic area may be associated with one communication terminal or with multiple communication terminals.

For example, whenever an agent connects to the call center server SCA via a communication terminal TC, that terminal transmits to the server SCA information comprising the agent's status data DonA, an identifier of the agent IdA, and a reference RefZ of the geographic area associated with the communication terminal TC.

The agent connects to the call center server SCA via the communication terminal TC by means of an identifier and password, and the call center server SCA saves an identifier IdA of the agent as a match for the agent's status data DonA, and regularly updates the agent's status data in the lookup table. The status data DonA related to an agent comprises, for example, the duration of a current call being handled by the agent, the number of calls handled, and the agent's progress on his or her goals.

The data management server SGD, when ordered by the call center server SCA, saves the agent's identifier IdA as a match for the reference RefZ of the geographic area. Furthermore, the data management server SGD contains another lookup table between the references RefZ of the geographic areas and the identifiers IdZ of the geographic areas, an identifier IdZ potentially being a marker, or location data set, or RFID data set, and a reference RefZ that may potentially be a character string defining the corresponding geographic area.

In one variant, whenever an agent connects to the call center server SCA via a communication terminal TC, the terminal transmits to the server SCA information comprising the agent's status data DonA, an identifier IdA of the agent, and an identifier IdZ of the geographic area associated with the communication terminal TC, and the data management server SGD, when ordered by the call center server SCA, saves the agent's identifier IdA as a match for the identifier IdZ of the geographic area.

In all cases, the data management server SGD has in its memory a lookup table comprising agent identifiers IdA respectively associated with geographic area identifiers IdZ.

With reference to FIG. 2, a method for managing the operation of a call center according to one embodiment of the invention comprises steps E1 to E5 executed within a communication system.

In a preliminary step E01, agents each choose a communication terminal TC and connect to the call center server SCA via the chosen terminal. For each agent connected to the call center server SCA via a communication terminal TC, the server SCA retrieves information comprising the agent's status data DonA, an identifier IdA of the agent, and a reference RefZ of the area associated with the communication terminal TC.

Thus, each agent is associated with a communication terminal TC that is itself associated with a geographic area.

The call center server SCA produces and saves a lookup table matching agents' identifiers IdA and status data DonA related to the agents, and orders the data management server SGD to save a lookup table matching agents' identifiers IdA and references RefZ of geographic areas.

In step E1, the supervisor equips his or her mobile terminal TM with means of identifying geographic areas or updates those means. For example, the mobile terminal TM downloads from a data management server SGD a set of markers that are associated with geographic areas, or a set of RFID data that makes it possible to communicate with RFID badges.

In step E2, the supervisor moves within geographic areas to monitor the agents' status. Whenever the supervisor is in the vicinity of a geographic area in which an agent connected to the call center server SCA is located, the monitoring module SUP of the supervisor's mobile terminal TM determines the identifier IdZ of the geographic area in which the agent is located.

In particular, the supervisor's mobile terminal TM automatically detects the presence of that identifier IdZ within the geographic area in which the agent is located, whenever the supervisor is near that identifier.

For example, a camera of the mobile terminal takes an image capture of the geographic area and automatically identifies a marker placed within the geographic area, for example on a table supporting the communication terminal, the marker corresponding to an identifier of the geographic area. The marker is automatically detected if the supervisor is close enough to the marker so that the image resolution of the geographic area makes it possible to identify the marker, for example at a distance a few meters away from the marker.

According to another example, an RFID reader included within the mobile terminal automatically communicates with an RFID badge associated with the geographic area, whenever the mobile terminal is close enough to the RFID badge, the RFID badge corresponding to an identifier of the geographic area. The RFID badge is thereby automatically detected if the mobile terminal is about a few centimeters away from the RFID badge.

In step E3, the communication module MC of the mobile terminal TM transmits a first request comprising the geographic area's identifier IdZ to the data management server SGD in order for it to identify in a lookup table IdA the identifier of the agent associated with the identifier IdZ of the geographic area and transmit the agent's identifier IdA to the mobile terminal TM.

In one embodiment, the data management server SGD identifies within a lookup table the reference RefZ of the geographic area associated with the identifier IdZ of the geographic area, and the identifier IdA of the agent associated with the reference RefZ.

In step E4, the communication module MC of the mobile terminal TM transmits a second request comprising the agent's identifier IdA to the call center SCA so that that server can identify within a lookup table status data DonA related to the agent associated with the agent's identifier IdA and transmits the agent's status data DonA to the mobile terminal TM.

In step E5, the mobile terminal TM provides at least some of the agent's status data DonA to the supervisor through a graphical display by means of the graphical user interface IG.

For example, the mobile terminal displays the agent's contact information, such as his or her last name and first name, and displays identification about the agent's status based on status data DonA related to the agent.

For example, said indication may comprise a red light signal if the agent encounters a problem or a green light signal if the agent has no particular problem. Said indication may also comprise some of the status data DonA related to the agent comprising, for example, the duration of the call being handled by the agent and the number of calls already handled by the agent, or may comprise a selectable link to that portion of the data.

The invention described here pertains to a method and mobile terminal for managing the operation of a call center. According to one embodiment of the invention, the steps of the inventive method are determined by the instructions of a computer program incorporated into a criminal, such as the mobile terminal TM. The program comprises program instructions that, when said program is loaded and executed within the terminal, carry out the steps of the inventive method.

Consequently, the invention also applies to a computer program, particularly a computer program on or within an information medium, suitable to implement the invention. This program may use any programming language, and be in the form of source code, object code, or intermediate code between source code and object code, such as in a partially compiled form, or in any other form desirable for implementing the inventive method.

The invention claimed is:

1. A method performed by a mobile terminal for checking the status of an agent assigned to a call center within which geographic areas are respectively associated with geographic area identifiers, communication terminals are respectively associated with geographic areas, and at least one call center server is capable of communicating with a data management server and communication terminals, said mobile terminal being in the possession of a supervisor capable of moving within the geographic areas and said method comprising:
    determining an identifier of the geographic area in which an agent connected to the call center server via a communication terminal associated with said geographic area is located;
    transmitting a first request comprising the geographic area's identifier to the data management server in order to retrieve within a first lookup table an identifier of the agent associated with the identifier of the geographic area;
    transmitting a second request comprising the agent's identifier to the call center server in order to retrieve within a second lookup table the agent's status data associated with the agent's identifier; and
    providing at least some of the agent's retrieved status data to the supervisor through a graphical display.

2. A method according to claim 1, wherein, after the agent connects to the call center server via the communication terminal associated with the geographic area, the call server saves an identifier of the agent as a match for the agent's status data within the second lookup table, and saves the agent's identifier as a match for the geographic area's identifier within the first lookup table within the data management server.

3. A method according to claim 1, wherein the geographic area's identifier in which the agent is located is determined by detecting that identifier's presence within the geographic area.

4. A method according to claim 3, wherein the geographic area's identifier is a marker.

5. A method according to claim 3, wherein the geographic area's identifier is a radio identification data set.

6. A method according to claim 1, wherein the geographic area's identifier is a location data set.

7. A method according to claim 1, wherein the agent's status data comprise the agent's contact information and an indication about the agent's status.

8. A mobile terminal for checking the status of an agent assigned to a call center in which geographic areas are respectively associated with identifiers of geographic areas, communication terminals are respectively associated with geographic areas, and at least one call center server is capable of communicating with a data management server and communication terminals, said mobile terminal being in the possession of a supervisor capable of moving within the geographic areas and said mobile terminal comprising:
- a management module configured to determine the identifier of the geographic area in which an agent who is connected to the call center server via a communication terminal associated with said geographic area is located;
- a communication module configured to:
  - transmit a first request comprising the geographic area's identifier to the data management server in order to retrieve within a first lookup table an identifier of the agent associated with the identifier of the geographic area; and
  - transmit a second request comprising the agent's identifier to the call center server in order to retrieve within a second lookup table the agent's status data associated with the agent's identifier; and
- a graphical user interface (GUI) module configured to provide at least some of the agent's retrieved status data to the supervisor through a graphical display.

9. The mobile terminal according to claim 8, further including:
- at least one processor executing processor executable instructions embodying at least one of the management module, the communication module, and the GUI module.

10. A non-transitory computer readable medium for use within a mobile terminal for checking the status of an agent assigned to a call center in which geographic areas are respectively associated with identifiers of geographic areas, communication terminals are respectively associated with geographic areas, and at least one call center server is capable of communicating with a data management server and communication terminals, said mobile terminal being in the possession of a supervisor capable of moving within the geographic areas and said non-transitory computer readable medium carrying instructions that, when loaded and executed by at least one processor of said mobile terminal, controls the at least one processor to carry out the following steps:
- determining an identifier of the geographic area in which the agent is located;
- transmitting a first request comprising the geographic area's identifier to the data management server in order to retrieve within a first lookup table an identifier of the agent associated with the identifier of the geographic area;
- transmitting a second request comprising the agent's identifier to the call center server in order to retrieve within a second lookup table the agent's status data associated with the agent's identifier; and
- providing at least some of the agent's retrieved status data to the supervisor through a graphical display.

* * * * *